(12) United States Patent
Svensson et al.

(10) Patent No.: US 9,020,691 B2
(45) Date of Patent: Apr. 28, 2015

(54) HYDRAULIC BRAKE SYSTEM FOR A MOTOR VEHICLE AND FAULT CONDITION DETECTION FOR SAME

(71) Applicant: Ford Global Technologies, LLC, Dearborn, MI (US)

(72) Inventors: Thomas Svensson, Leichlingen (DE); Rudolf Daniels, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/255,783

(22) Filed: Apr. 17, 2014

(65) Prior Publication Data

US 2014/0316643 A1 Oct. 23, 2014

(30) Foreign Application Priority Data

Apr. 18, 2013 (DE) .......................... 10 2013 206 990

(51) Int. Cl.
| | | |
|---|---|---|
| *G01M 17/00* | (2006.01) | |
| *B60T 17/22* | (2006.01) | |
| *B60T 13/66* | (2006.01) | |
| *B60T 17/02* | (2006.01) | |
| *B60T 13/74* | (2006.01) | |

(52) U.S. Cl.
CPC .............. *B60T 17/221* (2013.01); *B60T 13/66* (2013.01); *B60T 17/02* (2013.01); *B60T 17/22* (2013.01); *B60T 13/662* (2013.01); *B60T 13/745* (2013.01)

(58) Field of Classification Search
USPC ........................................ 701/33.9, 33.6, 83
See application file for complete search history.

(56) References Cited

U.S. PATENT DOCUMENTS

| | | | | |
|---|---|---|---|---|
| 2005/0168061 | A1* | 8/2005 | Scheller et al. ................. | 303/11 |
| 2006/0138861 | A1* | 6/2006 | Buschmann et al. ..... | 303/122.08 |
| 2008/0251328 | A1* | 10/2008 | Albrich Von Albrichsfeld et al. .............................. | 188/159 |
| 2011/0040439 | A1 | 2/2011 | Stephan et al. | |
| 2013/0234502 | A1* | 9/2013 | Drumm .......................... | 303/14 |

FOREIGN PATENT DOCUMENTS

| | | |
|---|---|---|
| DE | 102 35 373 A1 | 2/2004 |
| DE | 10 2010 029 220 A1 | 11/2011 |
| DE | 10 2010 043 887 A1 | 5/2012 |
| WO | WO 2011/018378 A1 | 2/2011 |
| WO | WO 2011/144455 A1 | 11/2011 |

* cited by examiner

*Primary Examiner* — Hussein A. Elchanti
(74) *Attorney, Agent, or Firm* — Jones Robb, PLLC; Raymond L. Coppiellie

(57) ABSTRACT

The present disclosure provides a hydraulic brake system for a motor vehicle and a method for the detection of a fault condition of the hydraulic brake system. An electronic control device determines at least one pressure value of the brake fluid of the brake system and at least one volume value of the brake master cylinder associated with the pressure value during an operation of a brake master cylinder. The electronic control device compares the determined pressure value and volume value with at least one pair of pressure-volume reference values for the detection of a fault condition of the brake system, wherein at least two different fault conditions of the brake system can be differentiated based on the comparison.

15 Claims, 2 Drawing Sheets

HYDRAULIC BRAKE SYSTEM FOR A MOTOR VEHICLE AND FAULT CONDITION DETECTION FOR SAME

CROSS REFERENCE TO RELATED APPLICATIONS

This application claims priority to German Application No 102013206990.1, filed on Apr. 18, 2013, the entire content of which is incorporated by reference herein.

TECHNICAL FIELD

The present disclosure relates generally to a method for the detection of a fault condition of a hydraulic brake system of a motor vehicle and a hydraulic brake system for a motor vehicle.

BACKGROUND

Brake systems of motor vehicles today are generally designed as hydraulic brake systems. In such systems, a brake master cylinder is provided, in which a pressure is generated in a pressure chamber filled with brake fluid by displacement of a piston connected to a brake pedal. The pressure is passed, by means of hydraulic lines, to at least one wheel brake cylinder. The wheel brake cylinder brings, for example, brake linings mounted on brake pads in contact with a brake drum or a brake disk as a result of the pressure of the brake fluid. This enables the braking force acting on the wheel connected to the brake drum or brake disk to be regulated by operating the brake master cylinder. The brake master cylinder is thereby normally operated by using the brake pedal, wherein a braking force booster can be connected to the piston rod of the brake master cylinder for boosting the braking force. The brake master cylinder is generally designed as a tandem brake master cylinder, which comprises two pressure chambers for applying pressure to two independent brake circuits. The two brake circuits can each act upon all wheels of the motor vehicle, but also can, for example, be divided between the individual wheels such that one of the brake circuits acts on the front wheels and the other on the rear wheels.

Because of the importance of the brake system for the safety of the motor vehicle, it is important to recognize possible fault conditions of the brake system, automatically if possible. One such fault condition is the presence of undissolved gas in the brake fluid, e.g., in the form of air bubbles. The presence of air bubbles in the brake fluid restricts the operability of the brake and the maximum achievable brake fluid pressure. That is, air in the brake system impairs the pedal feel and limits the maximum output pressure. Another fault condition is a rearward displacement of a piston of a wheel brake cylinder (also known as piston knock back). The pedal travel necessary for generating a braking effect is greatly increased by this, which is hardly controllable by the driver. That is, piston knock back increases the amount of pedal travel required to achieve deceleration, which is very hard for the driver to control. Finally, a third fault condition is a failure of a brake circuit. The achievable braking effect is likewise greatly reduced by this, which has to be taken into account as early as during the design of the brake circuit. In particular, loss of one circuit is the limiting factor for brake system sizing for a front rear split brake system. These three phenomena have a strong interaction which makes them difficult to distinguish from one another. For this reason, known brake systems do not provide sufficiently reliable detection of all the fault conditions described above.

With this in mind, the object of the present disclosure is to provide a method for the detection of a fault condition of a hydraulic brake system of a motor vehicle and a hydraulic brake system for a motor vehicle, wherein the disadvantages mentioned above are avoided.

SUMMARY

In accordance with various exemplary embodiments, the present disclosure provides a method for the detection of a fault condition of a hydraulic brake system of a motor vehicle. The method comprises, with an electronic control device, determining at least one pressure value of the brake fluid of the brake system and at least one volume value of the brake master cylinder associated with the pressure value during an operation of a brake master cylinder and comparing the determined pressure value and volume value with at least one pair of pressure-volume reference values for the detection of a fault condition of the brake system, wherein at least two different fault conditions of the brake system can be differentiated based on the comparison.

In accordance with another aspect of the present disclosure, a hydraulic brake system for a motor vehicle is disclosed. The hydraulic brake system comprises a brake master cylinder comprising a piston in a pressure chamber configured to contain brake fluid, wherein displacement of the piston in the chamber generates a fluid pressure passed via hydraulic lines to at least one wheel brake cylinder. The system further comprises a pressure sensor configured to sense at least one pressure value of the brake fluid and a displacement sensor configured to sense at least one volume value associated with the pressure value. An electronic control device is operatively connected to the sensors and is configured to determine at least one pressure value of the brake fluid and at least one volume value of the brake master cylinder associated with the pressure value during an operation of a brake master cylinder; and compare the determined pressure value and volume value with at least one pair of pressure-volume reference values for the detection of a fault condition of the brake system, wherein at least two different fault conditions of the brake system can be differentiated based on the comparison.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
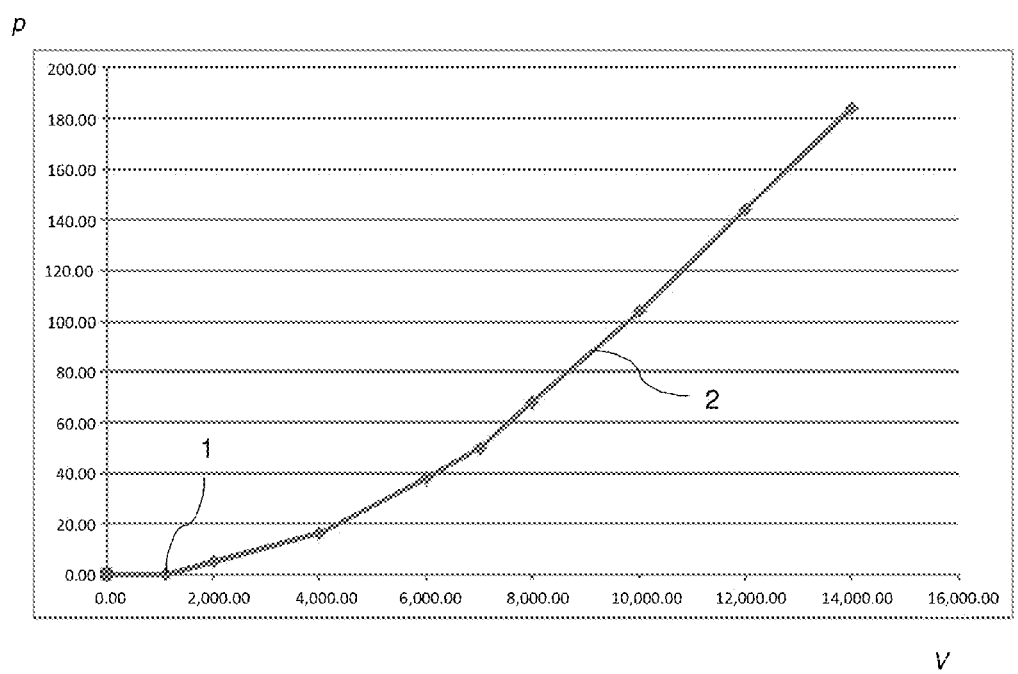
FIG. 1 is a graphic representation of a relationship between brake fluid pressure and displaced volume of brake fluid for a hydraulic brake system in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method for the detection of a fault condition of a hydraulic brake system of a motor vehicle is provided. In the method, a predefined pressure vs. volume curve is provided. The actual pressure vs. volume consumption is compared to these values as described below.

In accordance with the present teachings, a brake system is capable of measuring pressure to volume relation such as a mechanical brake actuation system containing a reference pressure to volume curve, which includes the nominal dead stroke travel and at a minimum six characteristic pressure to volume points. In order to avoid false positive detections all pressure values utilized will be higher than a certain threshold. In addition, the mechanical brake actuation system adjusts these characteristic values at a slow rate (maximum relative change rate lower than or equal to about 1%) just before shutting the system down, if, during the current system awake cycle, no circuit lost event and no air in system event has been detected.

During every brake actuation, the mechanical brake actuation system monitors the pressure to volume curve. The mechanical brake actuation system compares the volume consumption at the reference pressure points with the reference curve ones. If the relative volume consumption difference exceeds a certain threshold, this is marked as one deviation event. The trigger condition for a circuit lost event is fulfilled, if at a minimum five consecutive deviation events are monitored in at a minimum two consecutive braking events. During every brake actuation the mechanical brake actuation system monitors the dead stroke travel and compares it with its reference value. If the relative dead stroke travel change exceeds a certain threshold, this is marked as one potential air event. The trigger condition for an air in system event is fulfilled, if at a minimum three consecutive potential air events are monitored. If only one potential air event has been detected and the dead stroke travel is within the specified range at the next brake actuation, this is marked as piston knock back event. The detection of these conditions is described in more detail below.

In the method, at least one pressure value of the fluid of the brake system and at least one volume value of the brake master cylinder associated with the pressure value are determined during the operation of a brake master cylinder. The fluid pressure may be measured by a pressure sensor in fluid communication with the brake master cylinder. The pressure value identifies the brake fluid pressure prevailing in the brake system at a certain point in time, especially in a pressure chamber of the brake master cylinder. A displacement sensor associated with the brake master cylinder may be provided for measurement of the volume of the brake master cylinder. The displacement sensor determines the distance covered by a piston of the brake master cylinder at the same point in time or the position adopted by the piston at the point in time at which the fluid pressure is measured. The brake master cylinder may be operated by means of a brake pedal connected to the piston, wherein a braking force booster also can be provided. The volume of fluid displaced from the pressure chamber of the brake master cylinder, starting from an initial state, can be determined by measuring the distance covered by the piston of the brake master cylinder or the position adopted by the piston. When "volume" is mentioned below, this means the volume of brake fluid displaced from the brake master cylinder.

To detect a fault condition of the brake system, the at least one determined brake fluid pressure value and the at least one volume value associated with the pressure value are compared with at least one pair of pressure-volume reference values. According to the present disclosure, at least two different fault conditions of the brake system can be distinguished from each other in this manner.

Because at least two different fault conditions of the brake system are not only detectable, but can also be distinguished from each other, the achievable safety of operation of the brake system can be increased. In particular, a basis can be provided for targeted countermeasures and/or for the output of a warning signal that makes a currently present fault condition known to a driver because at least two different fault conditions can be identified.

According to an exemplary embodiment of the method, during each of at least two successive operations of the brake master cylinder, at least one pair of pressure-volume values, i.e., a pressure value and a volume value associated therewith, is determined. For the detection and especially identification of a fault condition, the at least two determined pairs of pressure-volume values are compared with at least one pair of reference values for the brake fluid pressure and the displaced volume of brake fluid associated therewith. Because pressure and volume values are determined for at least two successive operations of the brake master cylinder and are evaluated by comparison with at least one reference pressure and reference volume value, a fault condition of the brake system can be detected with greater reliability. An improved condition for generating a corresponding warning signal or for a corresponding countermeasure is provided by this and the operational safety of the brake system is increased.

In accordance with the present teachings, the volume value of the at least one pair of pressure-volume reference values corresponds to a target value for the dead stroke; if a plurality of pairs of reference values are provided, then these include a pair of values whose volume value is a target value for the dead stroke. The dead stroke is a variable measured during each application of the brake and the dead stroke represents the displacement travel of a piston of the brake master cylinder from a non-activated state to the point where the fluid pressure starts to increase. Said another way, the dead stroke corresponds to a displaced volume of brake fluid generated during the period from a non-activated state to the point where the fluid pressure starts to increase, or the period during which the pressure generated in the brake fluid is not yet significantly increased. The dead stroke can therefore be determined by taking repeated pressure measurements during operation of the brake master cylinder starting from a non-activated state of the brake master cylinder or of the piston of the brake master cylinder and using the pressure measurement value immediately preceding a significant pressure rise together with the associated measurement value for the displaced volume of brake fluid as the pressure-volume value pair. For a plurality of successive operations of the brake master cylinder, especially for each operation of the brake master cylinder, a dead stroke is determined for each operation and compared with a target value for the dead stroke, whereby a deviation of the dead stroke is determined for each operation. This continuous comparison provides an improved basis for the detection and identification of fault conditions.

According to one embodiment of the method, if a deviation of the dead stroke that exceeds a specifiable first threshold value is determined during operation of the brake master cylinder and a deviation that no longer exceeds the first threshold value is determined for the next subsequent operation of the brake master cylinder, it is concluded that there is a rearward displacement or a rebound of a brake piston, also referred to as piston knock back. That is, if the measured dead stroke is higher than a certain threshold in a first operation of the brake master cylinder and is below the threshold in subsequent operations of the brake master cylinder, the deviation is identified as a piston knock back event. In this way such a fault condition can be detected and uniquely identified in a particularly simple manner. A corresponding warning signal can be output for the information of the driver.

Additionally or alternatively, if the measured dead stroke is higher than a certain threshold in a first operation of the brake master cylinder and is continuously above the threshold in subsequent operations of the brake master cylinder, the deviations are identified as an air in the system event. For example, in accordance with one exemplary embodiment of the present disclosure, a dead stroke is determined for each of at least three successive operations of the brake master cylinder, and a respective deviation of the end play is determined by comparison with a target value for the respective dead stroke. If each of the at least three successive deviations of the dead stroke is greater than a specifiable second threshold value for the deviation of the dead stroke, then the presence of gas in the brake fluid is identified as a fault condition. The second threshold value may be different from the first threshold value or can be the same as the first threshold value. In this way, the presence of undissolved gas or gas bubbles in the brake system can be detected simply and reliably and identified as a currently present fault condition. Because of the detection and identification of the fault condition, a warning signal can be output, based on which a driver can identify that maintenance measures are necessary, such as, for example, replacement of the brake fluid.

The at least one pair of reference values forms part of a reference characteristic curve that relates the brake fluid pressure and the displaced volume of brake fluid to each other. The fault condition of the brake system can be detected and identified by a comparison of the determined pairs of values with the reference characteristic curve for pressure and volume. The pressure-volume reference characteristic curve comprises at least one other pair of pressure-volume reference values. By using a reference characteristic curve containing a plurality of pressure values and associated volume values for the evaluation of the determined pairs of pressure-volume values, detection of a fault condition and distinguishing a currently present fault condition from other possible fault conditions are possible with particularly high reliability.

In accordance with one aspect of the present disclosure, the reference characteristic curve contains at least six pairs of values of pressure and volume, each of which lie above a minimum pressure value and a minimum volume value. Particularly reliable detection and identification of fault conditions are enabled because the pressure-volume reference characteristic curve contains at least six pairs of values. Furthermore, a false positive detection of fault conditions is prevented because the pairs of pressure-volume values that form the reference characteristic curve lie above the minimum values.

According to an exemplary embodiment of the method of the present disclosure, a plurality of pairs of pressure-volume values is determined for each operation of the brake master cylinder and a corresponding deviation is determined by comparison with the pressure-volume reference characteristic curve or pair of pressure-volume reference values calculated from the pressure-volume reference characteristic curve. The deviation can be, for example, a deviation of the measured pressure from a reference pressure associated with a reference volume that corresponds to the measured volume; the deviation also can be, for example, a deviation of the measured volume from a reference volume associated with a reference pressure equal to the measured pressure. In the case in which a specifiable number (e.g., at least 5) of successively determined deviations, which were determined during at least two successive operations of the brake master cylinder, each exceeds a specifiable threshold value for the deviation, a failure of a brake circuit is concluded. Based on the fault condition of the failure of a brake circuit detected and identified in this way, a response may be initiated, for example, a warning signal can be initiated or at least one inlet valve of the failed brake circuit can be closed in order to enable the brake fluid pressure necessary for braking to be generated more reliably in the remaining brake circuit. Improvement of the operational safety of the brake system is enabled in this way.

According to another exemplary embodiment of the present disclosure, the fault condition of a rearward displacement of a brake piston (a piston knock back event) is alternatively or additionally detectable when the at least one pressure value determined for an operation of the brake master cylinder is the pressure value associated with a specified initial volume value and is below a threshold value. The initial volume value and the threshold value are thereby selected to permit reliable detection of a rearward displacement of a brake piston (a piston knock back event) while minimizing the number of false positive detections. If the force to create an initial fluid displacement is below a preset threshold and this occurs one time only, this is a piston knock back event and hence a corresponding event marker is set to TRUE in an electronic control device.

Following detection of the rearward displacement of the brake piston, a pressure (for example, 1-3 bar) is generated in the brake system in order to bring the rearward displaced brake piston back into its target position. This can take place independently of the type of detection and identification of the rearward displacement. That is, the piston knock back may be eliminated by actively generating low brake fluid pressure independent of the driver's actions. In this way the fault condition of a rearward displacement of a brake piston (a piston knock back event) cannot only be detected, but also is automatically eliminated. Once this has been done the piston knockback event marker is set to FALSE in the electronic control device.

In accordance with the present disclosure, a plurality of pressure-volume value pairs is determined for an operation of the brake master cylinder, in particular for each operation of the brake master cylinder, and a gradient is calculated therefrom. The determined gradient is compared with the gradient of a comparison characteristic curve that lies below the reference characteristic curve and, for example, has a gradient that is smaller by a specifiable deviation amount. In this way, particularly reliable detection and identification of fault conditions of the brake system are possible. That is, in this exemplary embodiment, characteristic value pairs are not compared. Instead, the gradient of the measured pressure volume curve is compared to the gradient of the reference curve.

For example, for a pressure value less than about 15 bar, if a gradient is determined that is lower than the gradient of the comparison characteristic curve associated with the corresponding pressure, then the presence of undissolved gas in the brake fluid is concluded. That is, if the piston knockback event marker is set to FALSE, air in the system is detected by comparing the initial force or pressure vs. travel increase rate at pressures below about 15 bar. If the increase rate is lower than the predetermined comparison pressure volume curve, this is an air in the system detection event. A piston knock back detection and compensation cycle must be completed and the event marker set to FALSE prior to activation of an air in the system detection. In this way, the fault condition can be particularly reliably detected and identified.

At a pressure value above about 20 bar, if a gradient is determined that is smaller than the gradient of the comparison characteristic curve at the corresponding pressure, then the fault condition of failure of a brake circuit exists. That is, if the force or pressure vs. travel increase rate (gradient) at pressures above about 20 bar is decreased compared to that of the predetermined comparison pressure to volume curve and the decrease is larger than a predefined threshold, the loss of a brake circuit detection is set to TRUE. In this way, a particularly reliable detection of the failure of a brake circuit and differentiation of the fault condition from other fault conditions is possible.

Based on the detection and identification of the fault condition, automatic countermeasures may be initiated, for example, an inlet valve of the failed brake circuit can be closed in order to enable more reliable generation of the brake fluid pressure that is required for braking in the non-failed brake circuit.

As an option the number of times of detecting a potential loss of a brake circuit event before entering a qualified brake circuit lost state, may be dependent on the amount of decrease in the individual gradients. For example, a failure of a brake circuit is only detected as a fault condition if at a pressure value above about 20 bar, for a specifiable number of operations of the brake master cylinder, and in particular successive operations, the determined gradient is smaller than the gradient of the comparison characteristic curve for a corresponding pressure value. The specifiable number may be dependent on the magnitude of the deviation of the determined gradient from the gradient of the comparison characteristic curve. In this way a false positive detection of a failure of a brake circuit can be more reliably avoided; which is of particular value where automatic countermeasures are initiated based on the detection of the fault.

According to one exemplary embodiment of the method, when the brake system is switched on or off, if no fault condition has been detected since a preceding switch-on of the brake system, especially no failure of a brake circuit and no presence of gas in the brake fluid, the at least one pair of pressure-volume reference values is adapted according to the at least one determined pair of pressure-volume values. In particular, a pressure-volume reference characteristic curve and possibly a comparison characteristic curve are adapted correspondingly. Here the characteristic curve is replaced by the determined pairs of values of pressure and volume or suitably averaged and/or interpolated measurement values. If the adaptation takes place when switching off the brake system, then this can especially occur when shutting down an operating program of an electronic control device of the brake system, e.g., when shutting down the ignition of the motor vehicle or when removing the ignition key from the ignition lock. Alternatively, the adaptation can also occur when switching on the brake system, i.e., when starting the operating program of the electronic control device. In this way, particularly reliable detection and identification of fault conditions of the brake system are enabled in a plurality of operating situations. Advantageously, the change of the adaptation of the characteristic curve can be limited in magnitude here, for example to magnitudes below one percent of the previously applicable respective pressure or volume value, in order to minimize the effects of any erroneous measurements.

In the case in which, based on the detection of a rearward displacement of a brake piston, the brake piston is automatically brought into its target position, or in the case of automatic closure of an inlet valve based on detection of circuit failure, a method in accordance with the present teachings further includes at least the above-mentioned step for eliminating the relevant fault condition, i.e., the fault condition may be automatically eliminated.

In accordance with the present disclosure, a hydraulic brake system for a motor vehicle is provided. The brake system comprises a brake master cylinder, in which by displacement of a piston in a pressure chamber filled with brake fluid a pressure is generated in the brake fluid, which pressure can be passed via hydraulic lines to at least one wheel brake cylinder of the motor vehicle. The brake system also comprises an electronic control device as well as at least one pressure sensor, which is designed for the measurement of a pressure value of the brake fluid. The brake system also comprises at least one displacement sensor, which is arranged for the measurement of a travel or a position of the piston and hence of a volume value associated with the pressure value. The electronic control device is designed for the detection of the determined pressure value and of the determined volume value and for performing the above-described method for the detection of a fault condition of a hydraulic brake system of a motor vehicle based on the detected pairs of pressure-volume values. The electronic control device can comprise processor means for this that are arranged for performing the above-described method and storage means for the storage of the at least one pair of pressure-volume reference values or the pressure-volume reference characteristic curve or the comparison characteristic curve. In this way reliable detection and identification of a fault condition of the brake system and hence operation with increased safety are enabled.

The electronic control device can also be designed for the triggering of a warning signal or for initiation of countermeasures based on the detected fault condition of the brake system, e.g., for generating a pressure for the elimination of a rearward displacement of a brake piston (piston knock back) or for closing at least one inlet valve of a brake circuit on detection of a failure of the brake circuit.

Turning now to the drawings, FIG. 1 illustrates an exemplary relationship between the determined brake fluid pressure p (bar) and the determined displaced brake fluid volume V ($cm^3$). As will be understood by those of skill in the art, the units used in FIG. 1 for exemplary purposes only; calculations may be performed using different units of measure. The curve illustrated in FIG. 1 shows the dead stroke g initiating at the origin of the graph and extending through the point before which there is a significant pressure increase (for example, identified as point 1 on the graph of FIG. 1). The curve of FIG. 1 also shows a nonlinear pressure rise (identified as point 2 on the graph) during further operation of the brake pedal or of the brake master cylinder. A corresponding relationship can be stored as a reference curve or as a pair of reference values ($p_{ref}$, $V_{ref}$) in a memory of an electronic control device. A target value $g_{soll}$ of the dead stroke can for example be given by the reference curve as the volume $V_{ref}$ up to which the brake fluid pressure $p_{ref}$ is zero. In order to enable adaptation to gradual changes of the brake system, the reference curve or the pair of reference values ($p_{ref}$, $V_{ref}$) is adapted taking into account the measured values p, V when no failure of a brake circuit and no presence of gas have been detected in the brake fluid during a preceding switch-on phase of the brake system. The change of the pressure values $p_{ref}$ or the volume values $V_{ref}$ is limited, for example, to amounts of less than about 1% of the respective previously stored values $p_{ref}$ or $V_{ref}$.

According to an exemplary embodiment of the method according to the present disclosure, a hydraulic brake system with mechanical braking force boosting, or with a vacuum-operated braking force booster, is controlled by an electronic control device. A reference characteristic curve is stored in a memory of the control device, illustrating a reference relationship of brake fluid pressure p and displaced volume of brake fluid V and containing a target value for the dead stroke g and at least 6 further pairs of reference values of brake fluid pressure p and displaced volume of brake fluid V.

Figure 2:
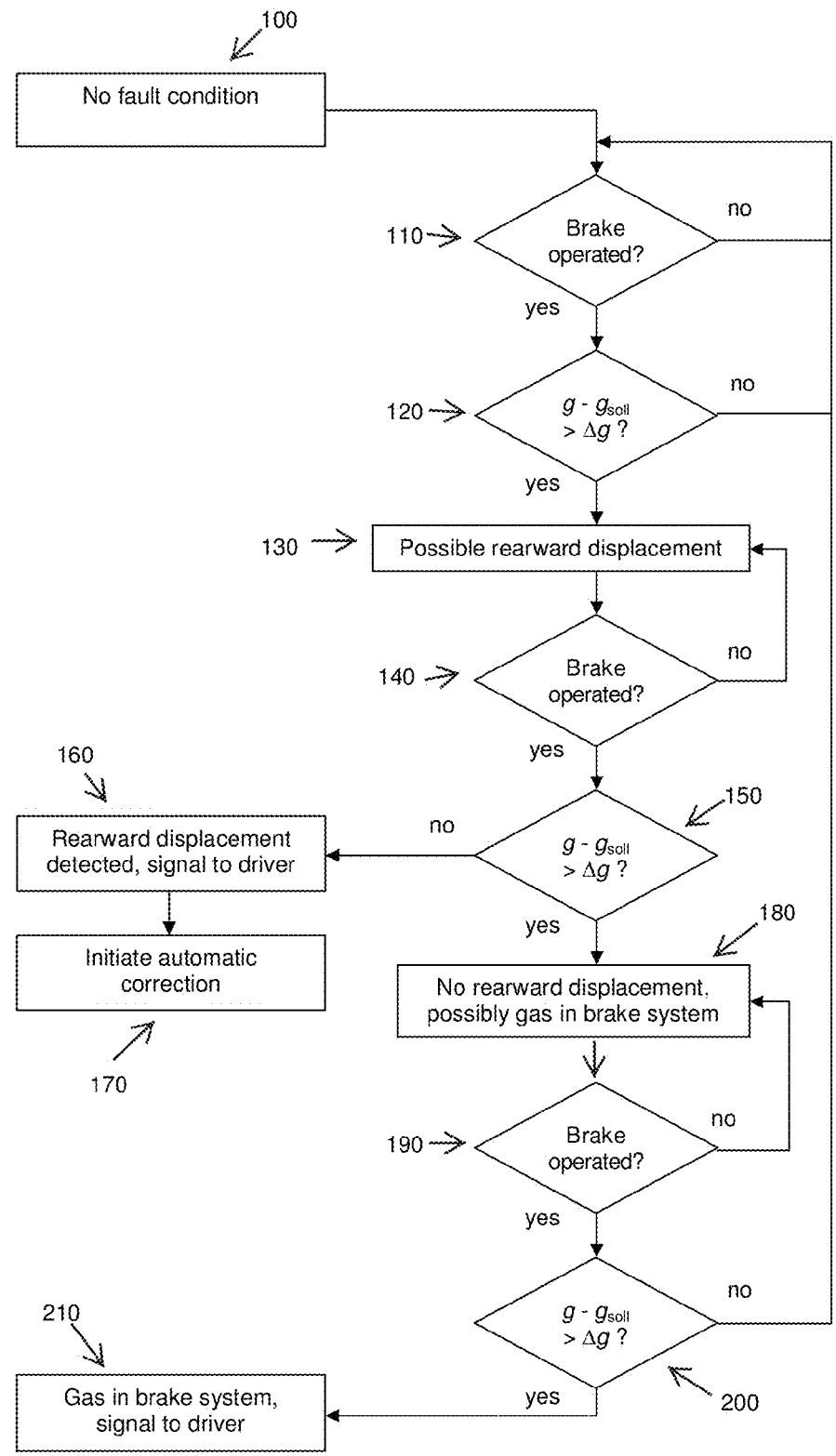
FIG. 2 is a simplified flow chart illustrating a method according to an exemplary embodiment of the present disclosure.

As illustrated in FIG. 2 and according to the exemplary embodiment of the method, the method may begin at step 100, at which there is no fault condition identified. During each operation of the brake pedal identified (step 110), after the piston of the brake master cylinder has moved back to an initial position due to the driver releasing the brake pedal, the dead stroke g is determined and compared with the stored target value $g_{soll}$ (step 120). If the deviation of the determined dead stroke g from the target value $g_{soll}$ exceeds a specified threshold value $\Delta g$, this can indicate a rearward displacement of a brake piston (a possible piston knockback event). A rearward displacement value in the memory of the control device is then set to "TRUE" (step 130).

For a subsequent, further operation of the brake pedal (determined at step 140) the dead stroke g is again determined and compared with the stored target value $g_{soll}$ (step 150). If the deviation of the determined dead stroke g from the target value $g_{soll}$ no longer exceeds the threshold value $\Delta g$ (step 160), this is recorded as a deviation event that indicates a rearward displacement of a brake piston (piston knock back event). In this case a signal is output to the driver of the motor vehicle; in addition, automatic measures for correcting the corresponding fault condition can be initiated (step 170), for example, a pressure of about 1-3 bar can be generated in the brake system in order to eliminate the rearward displacement.

If during the further operation of the brake pedal (step 140) the deviation of the determined dead stroke g from the target value $g_{soll}$ exceeds the threshold value $\Delta g$ again (step 150), this can indicate the presence of gas in the brake system. In this case it is concluded that there is not rearward displacement of a brake piston (piston knock back event) and the rearward displacement value in the memory is set to "FALSE" again (step 180). In a subsequent, further operation of the brake pedal (step 190) the dead stroke g is determined again and is compared with the stored target value $g_{soll}$ (step 200). If the deviation of the determined dead stroke g from the target value $g_{soll}$ again exceeds the threshold value $\Delta g$, this is recorded as a deviation event that indicates the presence of gas in the brake system (step 210). In this case a corresponding warning signal is output to the driver of the motor vehicle; otherwise, if the deviation of the determined dead stroke g from the target value $g_{soll}$ does not again exceed the threshold value $\Delta g$ it is assumed that there is neither a rearward displacement of a brake piston nor gas in the brake system and the process is started again at step 100.

Thus, in the exemplary embodiment of the method, it is assessed as the detection of undissolved gas in the brake fluid if during three successive determinations of the dead stroke g such deviation events are recorded in each case. If, on the other hand, following a first deviation event the deviation of the dead stroke g from the target value $g_{soll}$ determined during the next operation of the brake pedal no longer exceeds the specified threshold, then it is concluded that the preceding deviation was caused by a rearward displacement of a brake piston. In the described exemplary embodiment the threshold value for the detection of gas in the brake fluid is the same as the threshold value $\Delta g$ for the detection of a rearward displacement of a brake piston. Based on the respectively detected and identified fault condition a corresponding warning signal can be output and/or a corresponding entry in an electronic fault or maintenance memory can take place.

Moreover, during each operation of the brake pedal, according to one aspect of the method according to the exemplary embodiment, which is not illustrated in FIG. 2, other values of pressure p and volume V are recorded. In the event of determined pressure values p that correspond to the pressure values $p_{ref}$ of the pairs of reference values ($p_{ref}$, $V_{ref}$), the determined volume values V are compared with the corresponding volume values $V_{ref}$ of the pairs of reference values and volume deviations are determined. If the determined volume value V deviates by more than a specified threshold value from the corresponding reference volume value $V_{ref}$, it is recorded as a deviation event. If five successive determinations of the volume deviations are classified as such deviation events, then this is assessed as a detection of the failure of a brake circuit. Based on the fault condition detected and identified in this way, a corresponding warning signal can be output and/or a corresponding entry in a fault or maintenance memory can take place. In order to ensure generation of the brake pressure in the remaining brake circuit, an inlet valve of the failed brake circuit can also be automatically closed.

In another exemplary embodiment of the method in accordance with the present disclosure, a hydraulic brake system also is controlled by an electronic control device, in which a comparison characteristic curve is stored, which represents a comparison relationship of the brake fluid pressure $p_{comp}$ and the displaced volume of brake fluid $V_{comp}$ and which lies below the reference characteristic curve, which is similar to the relationship illustrated in FIG. 1. If the determined pressure $p_0$ that is necessary to displace a specifiable minimum volume of brake fluid $V_0$, or a force exerted on the piston of the brake master cylinder and corresponding to the pressure, lies below a specifiable threshold, a brake piston rearward displacement is concluded, a rearward displacement value in the memory of the control device is set to "TRUE" and a pressure of, for example, about 1-3 bar, is automatically generated in the brake system in order to eliminate the rearward displacement; the rearward displacement value is subsequently again set to "FALSE".

The gradient of the pressure rise dp/dV with increasing displaced volume V is used in order to detect gas in the brake system or a failure of a brake circuit according to this exemplary embodiment: if the rearward displacement value is "FALSE" and the gradient for pressures below about 15 bar is less than the gradient $dp_{comp}/dV_{comp}$ of the comparison characteristic curve by more than a specifiable gradient difference, then the presence of undissolved gas in the brake system is concluded; if the rearward displacement value is "TRUE", then the rearward displacement must initially be eliminated and the rearward displacement value set to "FALSE" (see above). As will be understood by those of skill in the art, the specifiable gradient difference will depend on the individual application based on vehicle and system characteristics. On the other hand, if for pressures above about 20 bar, the gradient dp/dV is less than the gradient $dp_{comp}/dV_{comp}$ of the comparison characteristic curve by more than a specifiable gradient difference, a failure of a brake circuit is concluded and a failure value in the control device is set to "TRUE". Again, as will be understood by those of skill in the art, the specifiable gradient difference will depend on the individual application based on vehicle and system characteristics. If the failure value is set to "TRUE", the inlet valves of the brake circuit can be closed in order to avoid further loss of brake fluid and in order to ensure the generation of brake fluid in the remaining brake circuit. This is especially advantageous if one of the two brake circuits of the dual circuit brake system is acting on the front wheels and the other is acting on the rear wheels.

The methods described above can be performed in one or more devices of the vehicle. For example, the methods can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for the detection of a fault condition of a hydraulic brake system of a motor vehicle, comprising:
   with an electronic control device:
   determining at least one pressure value of brake fluid of the brake system and at least one volume value of a brake master cylinder associated with the pressure value during an operation of the brake master cylinder; and
   comparing the determined pressure value and volume value with at least one pair of pressure-volume reference values for the detection of a fault condition of the brake system, wherein at least two different fault conditions of the brake system can be differentiated based on the comparison.

2. The method as claimed in claim 1, wherein during at least two successive operations of the brake master cylinder, at least one pressure-volume value pair is determined during each operation and is compared with the at least one pair of pressure-volume reference values.

3. The method as claimed in claim 2, wherein a reference volume value of the at least one pair of pressure-volume reference values corresponds to a target value for a dead stroke and wherein during a plurality of successive operations of the brake master cylinder the dead stroke is determined for each of the plurality of successive operations and a deviation of the dead stroke is determined for each of the plurality of successive operations by comparing the determined dead stroke with the target value for the dead stroke.

4. The method as claimed in claim 3, wherein a fault condition of a rearward displacement of a brake piston is detected when the deviation of the dead stroke exceeds a first threshold value for the deviation of the dead stroke during an operation of the brake master cylinder and does not exceed the first threshold value for the deviation of the dead stroke during a subsequent operation.

5. The method as claimed in claim 4, wherein a fault condition of a presence of gas in the brake fluid is detected when the determined deviation of the dead stroke is greater than a second threshold value for the deviation of the dead stroke during at least three successive operations of the brake master cylinder.

6. The method as claimed in claim 2, wherein the at least one pair of pressure-volume reference values belongs to a pressure-volume reference characteristic curve, which comprises at least one other pair of pressure-volume reference values.

7. The method as claimed in claim 6, wherein a reference pressure value and a reference volume value of the at least one other pair of pressure-volume reference values lie above a minimum pressure and a minimum volume.

8. The method as claimed in claim 6, wherein a plurality of pairs of pressure-volume values is determined during each operation of the brake master cylinder and deviations are determined by comparison with the pressure-volume reference characteristic curve, and wherein a fault condition of a failure of a brake circuit is detected by a specifiable number of successively determined deviations exceeding a threshold value for the deviation during at least two successive operations of the brake master cylinder.

9. The method as claimed in claim 1, wherein the at least one determined pressure value of the brake fluid of the brake system is the pressure value associated with a specified initial volume value and wherein a fault condition of a rearward displacement of a brake piston is detected by the determined pressure value lying below a threshold value.

10. The method as claimed in claim 1, wherein at least two pressure values of the brake fluid of the brake system and at least two volume values of the brake master cylinder associated therewith are determined and from the at least two pressure values and the at least two volume values a gradient is determined and is compared with a gradient of a comparison characteristic curve for detection of a fault condition of the brake system.

11. The method as claimed in claim 10, wherein, when the determined pressure value is less than about 15 bar, a fault condition of a presence of gas in the brake fluid is detected when the determined gradient is smaller than the corresponding gradient of the comparison characteristic curve.

12. The method as claimed in claim 10, wherein, when the determined pressure value is greater than about 20 bar, a fault condition of a failure of a brake circuit is detected when the gradient determined during at least one operation of the brake master cylinder is less than the corresponding gradient of the comparison characteristic curve.

13. The method as claimed in claim 12, wherein when the determined pressure value is above about 20 bar, the fault condition of the failure of a brake circuit is detected when the gradient determined for a specifiable number of operations of the brake master cylinder is less than the corresponding gradient of the comparison characteristic curve, wherein the specifiable number is dependent on the magnitude of the deviation of the determined gradient from the corresponding gradient of the comparison characteristic curve.

14. The method as claimed in claim 1, wherein, if no fault condition has been detected since a preceding switching on of the brake system, during switching off or switching on of the brake system, the at least one pair of pressure-volume reference values is adapted according to the at least one pair of determined pressure-volume values.

15. A hydraulic brake system for a motor vehicle, comprising:
a brake master cylinder comprising a piston in a pressure chamber configured to contain brake fluid, wherein displacement of the piston in the chamber generates a fluid pressure passed via hydraulic lines to at least one wheel brake cylinder,
a pressure sensor configured to sense at least one pressure value of the brake fluid;
a displacement sensor configured to sense at least one volume value associated with the pressure value; and an electronic control device being operatively connected to the sensors and being configured to determine at least one pressure value of the brake fluid and at least one volume value of the brake master cylinder associated with the pressure value during an operation of a brake master cylinder; and compare the determined pressure value and volume value with at least one pair of pressure-volume reference values for the detection of a fault condition of the brake system, wherein at least two different fault conditions of the brake system can be differentiated based on the comparison.

* * * * *